(12) United States Patent
Levine

(10) Patent No.: US 7,436,134 B2
(45) Date of Patent: Oct. 14, 2008

(54) CYCLICAL, AQUARIUM AND TERRARIUM LIGHT

(76) Inventor: Matthew B. Levine, 12360 NW. 78th Manor, Parkland, FL (US) 33076

( * ) Notice: Subject to any disclaimer, the term of this patent is extended or adjusted under 35 U.S.C. 154(b) by 413 days.

(21) Appl. No.: 11/401,750

(22) Filed: Apr. 11, 2006

(65) Prior Publication Data

US 2006/0271340 A1 Nov. 30, 2006

Related U.S. Application Data

(60) Provisional application No. 60/686,046, filed on May 31, 2005.

(51) Int. Cl.
*H05B 37/02* (2006.01)

(52) U.S. Cl. .................. 315/360; 315/362; 315/363; 315/DIG. 4

(58) Field of Classification Search ............. 315/75, 315/70, 71, 74, 72, 62, 63, 56, 57, 58, 59, 315/77, 360, 362, 363, DIG. 4, DIG. 5
See application file for complete search history.

(56) References Cited

U.S. PATENT DOCUMENTS

| | | | |
|---|---|---|---|
| 3,557,753 A | 1/1971 | Dantoni | 119/2 |
| 3,563,204 A | 2/1971 | Szilagyl | 119/5 |
| 3,949,241 A | 4/1976 | Maute | 307/141 |
| 4,122,800 A | 10/1978 | Mangarell | 119/5 |
| 4,754,571 A | 7/1988 | Riechmann | 47/59 |
| 4,773,008 A | 9/1988 | Schroeder et al. | 364/400 |
| 5,042,425 A | 8/1991 | Frost, Jr. | 119/5 |
| 5,212,672 A | 5/1993 | Loisch et al. | 368/79 |
| 5,307,762 A | 5/1994 | Englert | 119/266 |
| 5,365,886 A | 11/1994 | Frost, Jr. | 119/267 |
| 5,799,614 A | 9/1998 | Greenwood | 119/452 |
| 6,002,216 A * | 12/1999 | Mateescu | 315/363 |
| 6,039,005 A | 3/2000 | Themar | 119/249 |
| 6,184,628 B1 * | 2/2001 | Ruthenberg | 315/185 R |
| 2003/0150394 A1 | 8/2003 | Wolfe | 119/246 |

FOREIGN PATENT DOCUMENTS

| | | |
|---|---|---|
| FR | 2642935 | 8/1990 |
| FR | 2680632 | 3/1993 |
| GB | 2165965 A | 4/1986 |
| JP | 10014441 A | 1/1998 |

* cited by examiner

*Primary Examiner*—David Hung Vu
(74) *Attorney, Agent, or Firm*—Robert C. Kain, Jr.

(57) ABSTRACT

The aquarium or terrarium light systems simulates rising and setting of the sun. A housing contains two lamps, one variable lumen output for graduated light output and the other for full ON or OFF lighting. The light fixture contains a timer/dimming unit to variably increase power/voltage to the first lamp (variable output) and then to supply full ON power to the second lamp. The timer turns ON-OFF the second lamp late in the sunrise cycle and then early in the sunset cycle.

23 Claims, 4 Drawing Sheets

CYCLICAL, AQUARIUM AND TERRARIUM LIGHT

This is a regular application claiming the benefit of provisional application Ser. No. 60/686,046 filed May 31, 2005.

The present application relates to a sunrise and sunset lighting system for aquariums and terrariums.

BACKGROUND OF THE INVENTION

The aquarium and terrarium lights available on the market today turn on and off the lights abruptly, causing great stress on the animals contained therein. What is needed is a light that simulates the rising and setting of the sun such that the light is gradually increased and decreased, thus greatly reducing the major problem of stress on aquatic life due to sudden light or darkness. Other preexisting products have been designed to adjust the amount of darkness or light in aquariums. Some have moonlights as well. The major difference however is in the manner of which they operate. They simply have lights of different wattage. One or both (or more) may be on or off to provide different levels of light. They do NOT however work GRADUALLY to control the brightness levels; as they do not have the built in digital dimmer/timer feature which is unique to the Stress-Less System.

OBJECTS OF THE INVENTION

It is an object of the present invention to provide a simulated sunrise and sunset lighting system.

It is an object of the present invention to provide a first light or lamp with a variable increasing light output (sunrise sub-cycle) and, at a later time (pre-set or controlled by the user), a variable decreasing light output (sunset sub-cycle).

It is an object of the present invention to provide, intermediate the sunrise and sunset sub-cycles, a quick ON, fully powered light (a daylight sub-cycle).

It is an object of the present invention to provide, as an alternate embodiment, to provide an OFF then ON, interim sub-cycle for the first light when the second light is full ON.

SUMMARY OF THE INVENTION

The present invention relates to an aquarium or terrarium light designed to simulate the rising and setting of the sun. The light of the present invention is designed as an efficient way to create a less stressful and more natural environment for aquatic pets and/or reptiles that live in aquariums, terrariums or vivariums. It has unique mechanisms and functions that are not currently available in the marketplace. Studies indicate that abrupt lighting and sudden darkness are harmful for fish and other aquatic animals. It is commonly known that an abrupt change of lighting from a substantially dark environment to a fully lit environment causes aquatic life to physically react, often times by making sudden moves to hidden areas of the tank. For example, turning an aquarium light ON during the night time will cause frightened fish to dart off and swim into rocks and other objects in the aquarium. The cyclical lighting system of the present invention comprises a housing fixture that contains a minimum of two bulbs, one that allows for a gradual change in the intensity of light output and the other for sustained ON lighting.

One embodiment of the present invention is particularly suited for aquariums and the other for terrariums or aquariums. Both embodiments can be fitted with a flap/or front cover to fit custom-made or standard, assembled aquariums/terrariums. One embodiment is primarily designed for freshwater aquariums, but can be constructed for use in saltwater aquariums. The second embodiment is well suited for turtle habitat/terrariums as well as various other reptile species. The aquarium design is essentially a rectangular fixture containing two different light sources. The light fixture of the present invention also contains a built in timer/dimming unit. There is a fluorescent bulb (to provide necessary UV rays for the fish) as well as a ballast to ignite it. The second bulb is a simple soft bulb, such as an incandescent or halogen bulb. The second embodiment is particularly suited for reptiles, having an incandescent or halogen bulb to generate heat required by reptiles.

BRIEF DESCRIPTION OF THE DRAWINGS

Further objects and advantages of the present invention can be found in the brief description of the preferred embodiments when taken in conjunction with the accompanying drawings in which.

DETAILED DESCRIPTION OF THE INVENTION

Figure 1:
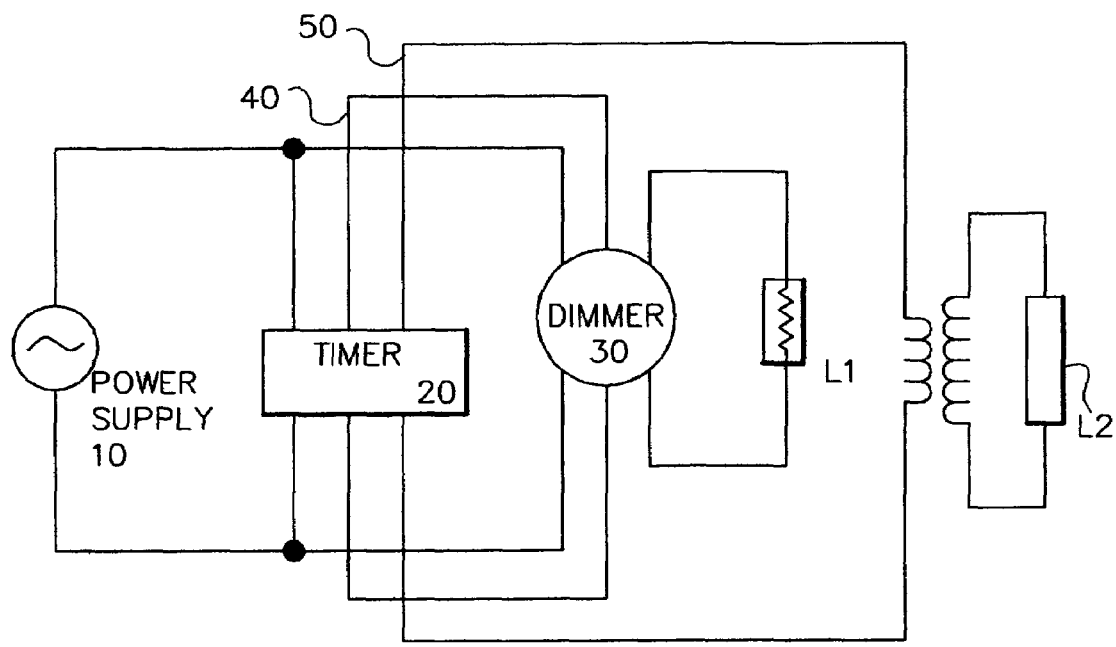
FIG. 1 diagrammatically and schematically illustrates one embodiment of the present invention.

The lighting fixture of the present invention sits atop the aquarium or terrarium. FIG. 1 diagrammatically illustrates one embodiment of the electrical circuit of the present invention. Power supply 10 is a traditional 110-120 V power supply, but other power supplies may be used (for example, standard 12 VDC). The power is supplied to timer 20 and dimmer 30. Timer 20 may be an electromechanical timer having a 24 hour cycle which can be programmed to cycle ON and OFF every 12 hours. The timer is electrically coupled to dimmer 30. Dimmer 30 is electrically coupled to light L1. Light L1 is typically a standard incandescent lamp, but other lamps may also be employed such as halogen lamps or an array of light emitting diodes (LEDs). Timer 20 is also electrically coupled to fluorescent light fixture L2. Light fixture L2 may also be an incandescent or halogen lamp, but in the preferred embodiment is a fluorescent light.

The system works as follows. Power supplied to timer 20 operates the clock internal to the timer (not illustrated, but known in the art). Upon the timer reaching the predetermined ON cycle, timer 20 at time t1 sends a control signal through circuit 40 to dimmer 30. Dimmer 30 may be programmed to cycle from a substantially zero power (or voltage) output at L1 to full power (or voltage) over a period of time such as 10 minutes to an hour (sunrise sub-cycle). As the power or voltage output changes over time, lamp L1 goes from no illumination to full illumination. Lamp set L1 simulates sunrise. L1 may be a series of lights. As an alternative embodiment, each lamp in the series may be separately turned ON, by control sub-circuits, to variably increase the total light output of the light system L1. Timer 20 contains a second set of outputs that make up circuit 50. At a predetermined time delay after time t1, circuit 50 is energized causing lamp L2 to be energized. Light L2 is a full ON or full OFF light output lamp. The time delay t2 of timer 20 should be set to be at or greater than the programmed cycle t1 of dimmer 30 (the duration of sunrise sub-cycle) to avoid having lamp L2 come ON prior to lamp L1 being at or near full illumination. In one embodiment, lamps L1 and L2 both remain illuminated throughout the ON cycle of timer 20. In another embodiment, lamp L1 is de-energized or turned off after lamp L2 has been illuminated. This alternative embodiment with the interim time OFF then time ON is more energy efficient because only one lamp is left energized during the ON daylight sub-cycle. Prior to the end of the daylight sub-cycle (near time t OFF for L2), L1 is turned full ON prior to initiating the decrease light level cycle or sunset.

After the predetermined, simulated daytime cycle reaches its end, i.e. 10 to 12 hours later, timer 20 reaches the OFF cycle. Timer 20 sends another control signal to dimmer 30 via circuit 40. In addition, timer 20 de-energizes circuit 50, causing lamp L2 to turn OFF. Next, dimmer 30 slowly reduces power to lamp LI, causing lamp LI to slowly go from full illumination to a low or no illumination state. This transitional cycle simulates sunset. A low illumination state may be preferred to simulate a "moon light" environment in the terrarium/aquarium. The term "variable increasing" and "variable decreasing" means that light output (lumens) slowly increases or decreases over the pre-set sub-cycle. These sub-cycles may be factory set or may be set by the user.

In the alternative embodiment in which lamp L1 is turned OFF during the ON cycle for L2 after full illumination is achieved (daytime sub-cycle), dimmer 30 turns lamp L1 back ON to full power so that the delayed aforementioned de-energization cycle may occur. The electrical circuit of FIG. 1 is one embodiment, and other designs may be utilized to accomplish the function of the present invention. For example, timer 20 and dimmer 30 may be one programmable, solid state device. Multiple timers, dimmers and slope detectors may be used in various combinations to achieve the sunrise, daylight and sunset sub-cycles.

Figure 2:
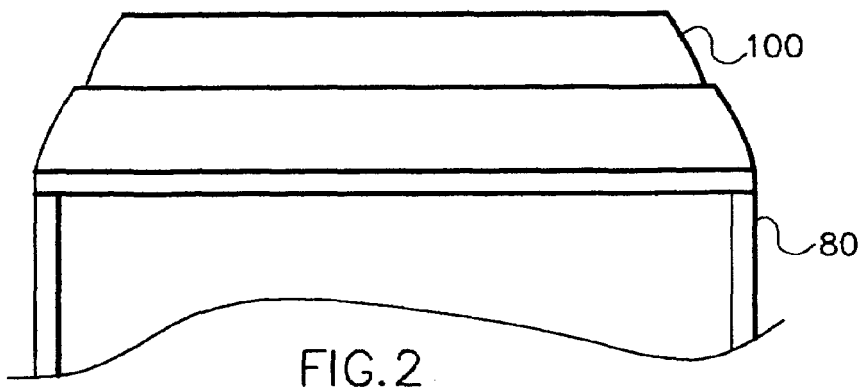
FIG. 2 is a perspective view of an aquarium or terrarium.

FIG. 2 illustrates the present invention 100 on a typical aquarium tank 80.

Figure 3A:
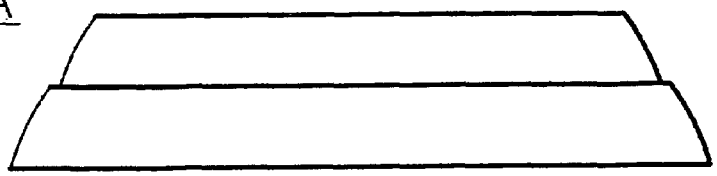
FIGS. 3A, 3B and 3C diagrammatically illustrate the front, bottom and rear view of the cover/light system in accordance with one embodiment of the present invention.
Figure 3C:
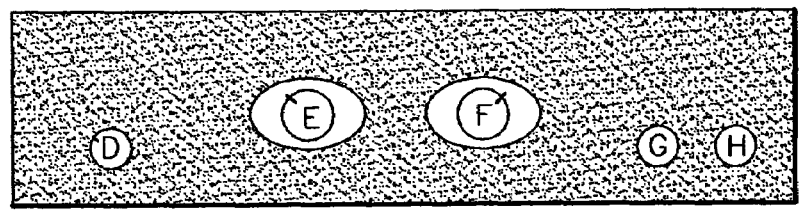
Figure 3B:
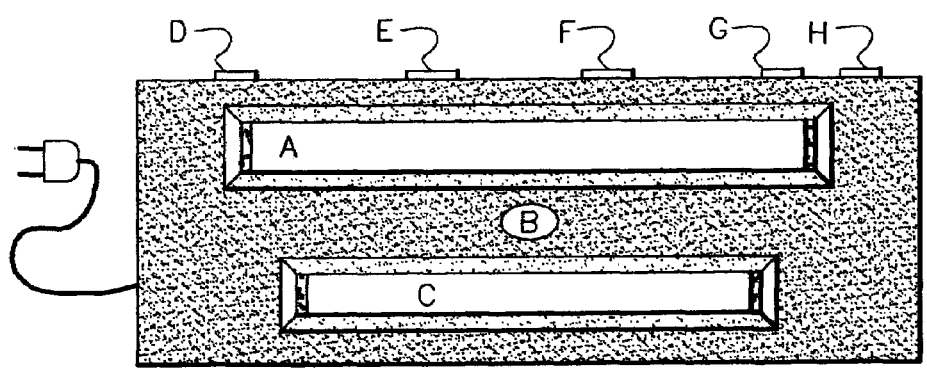

FIGS. 3A, 3B and 3C respectively illustrate a front, bottom and rear schematic views of one embodiment of the present invention. The following Control Table lists various illustrated controls.

| Control Table | |
|---|---|
| A | fluorescent bulb, quick start |
| B | igniter plug |
| C | soft bulb or lamp set, incandescent or LED set; white, orange sunrise, cool blue, desert pink |
| D | dimmer—dimmer manual control |
| E | dimmer duration ON control (sunrise time tsr cycle) |
| F | dimmer duration OFF control (sunset time tss cycle) |
| G | ON/OFF control for fluorescent (manual) |
| H | ON/OFF control for soft lamp set (manual) |

The user presets "on" and "off" times via the dials E, F on the rear of the fixture. In the illustrated embodiment, two smaller dials are included (controlling the dimming mechanism contained within the larger tinier dials) to set "durations" ranging from 5 to 30 minutes in 5 minute intervals for the artificial "sunrise" and "sunset" features. This dimming and timing feature is the most unique and important aspect of the system. In this example, a user sets an "ON" time t1 of 9:00 a.m. and an "OFF" time t2 of 11:00 p.m. The user selects a 10-minute "duration" for sunrise cycle tsr. At 9:00 a.m. the soft or incandescent bulb will slowly, over the 10-minute tsr pre-selected "duration" rise in wattage due to the function of the built in digital dimmer/timer. At 9:10 a.m. the soft bulb is supplied maximum power, allowing it to provide maximum illumination. It is also at this moment that the internal timer t1 +tsr triggers the ballast of the fluorescent light fixture to ignite the fluorescent bulb. At this point, all of the aquatic life has already been slowly awakened through the slow illumination of the incandescent bulb. There is no sudden light making them swim into rocks or coral, and more importantly there is considerably less stress on their fragile systems. At 11:00 p.m. t2 or sunset the cycle occurs. First, at 11:00 p.m., the fluorescent light shuts OFF Then, the power supply to the soft bulb slowly decreases tss or t sunset cycle causing the bulb to dim until 11:10 a.m. (10 minute tss pre-selected "duration"). At 11:10 p.m. t2 +tss, the first bulb L1 is completely off until the cycle repeats the next day. The user can at any time override or adjust and manipulate either or both of the lights to their satisfaction. This includes varying the dimness or brightness of the soft bulb (but not the fluorescent light due to cost, but it is possible for future models). The soft bulb may also be exchanged out for a bulb with color. The user can set an "orange sunrise" or a "red sunset" among other color themes. In the second model, the function is the same but the design is different. In this model for terrariums, an iridescent bulb is necessary to conduct heat for the turtles or reptiles to promote growth and health. It is on an accordion flexible arm to provide the user with easy maneuverability. It is attached on the side of the fluorescent encased light. Again the digital dimmer/timer is built in. As opposed to buying a lamp, light, and timer, and still not having the unique dimmer/timer feature, a consumer can get it all in one convenient and much more aesthetically pleasing product.

It also provides a potentially more aesthetically pleasing decor during the "sunrise" and "sunset" modes; especially if used with a colored bulb.

The present invention may be built with a flap attached to fit standard sized tank tanks. This flap is the top lid/front of the tank. The system can be used for various animals under captive conditions whereas they are not exposed to natural sunlight and earth cycles. It can also incorporate a third "MoonLight" to operate in saltwater aquariums. Additionally it can be individually applied to a pre-existing aquarium. It is designed (and can be custom made) to functionally fit any aquarium of any size. There are many combinations of light types as well as wattages (lumens) that may be implemented (depending on the animal(s) or fish in the habitat and their species specific needs). The lights in either light system can be designed many different ways and in different shapes and sizes. To fit smaller tanks, for example, the soft bulb and its housing fixture would be smaller than the fluorescent bulb as this model represents more of an L shape to fit a smaller tank. Accordingly, depending on the size of the tank, and the consumer's preference; the system can be modified in appearance. The dials are set behind the fixture, to keep out of viewing site, however, on other more artistic models, they may take different locations and shapes. The system's functions are not affected by the placement of the dials and buttons, and accordingly, many different possible designs for the system may be implemented.

In another embodiment, the two bulb feature is eliminated. The dimmer and timer mechanism can control the output of the fluorescent fixture directly. However, because of the higher cost of producing this embodiment, the two-bulb fixture is preferred.

Figure 4A:
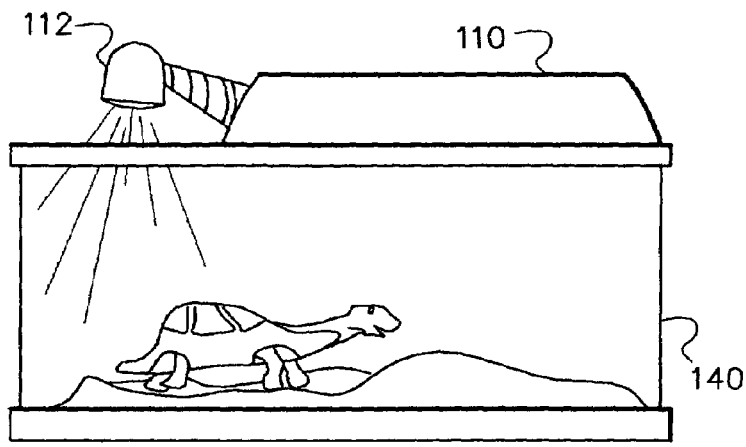
FIG. 4A diagrammatically illustrates the system with a terrarium.

FIG. 4A diagrammatically illustrates a terrarium 140 but may equally illustrate an aquarium. Incandescent or LED lamp (which has a variable light or lumen output) 112 is shown extending beyond the aquarium or terrarium cover/lamp system containment unit 110.

Figure 4B:
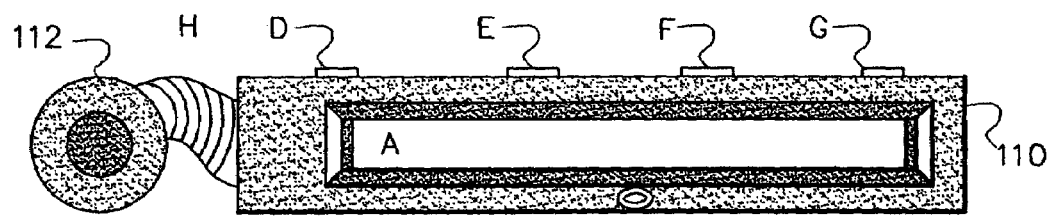
FIGS. 4B and 4C diagrammatically illustrate a bottom view and a top view of the cover and light system in accordance with another embodiment of the present invention.

FIG. 4B shows full ON lamp I or 114 and incandescent or variable light output lamp 112. The Control Table set forth above identifies controls D, E, F, G, H and B.

Figure 4C:
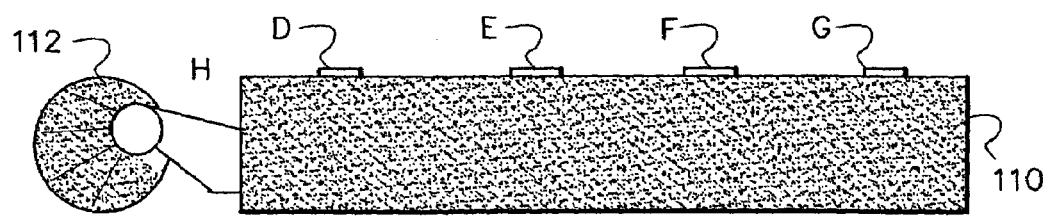

FIG. 4C diagrammatically illustrates a top view wherein control D, E, F, and G are provided along with manual ON/OFF control H for the variable light output lamp 112.

Figure 5:
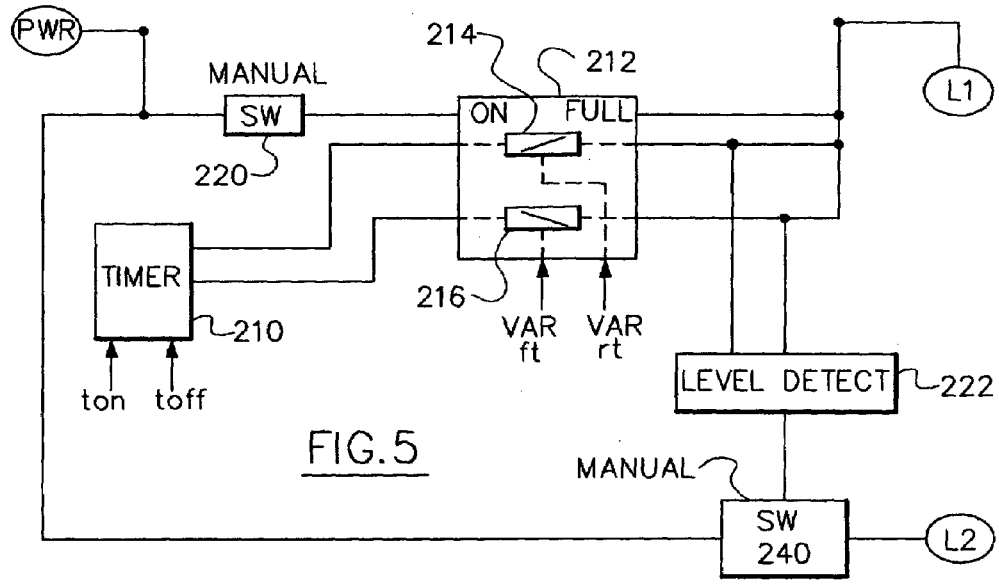
FIG. 5 diagrammatically illustrates another electrical schematic which powers a gradual ON and gradual OFF of light directed into the aquarium or terrarium.

FIG. 5 diagrammatically illustrates a schematic utilizing a single timer 210 providing outputs to a power circuit 212. Timer 210 enables the user to select a time ON (ton) and a time OFF (toff) time for the system. When timer 210 goes high, the signal is applied to one of the inputs of power control circuit 212 which causes the power to increase on the ramp up power function as shown by function block 214. The ramp up is a variably increasing signal supplying power. Upon generation of control signal toff by timer 210, the function block 216 and power control circuit 212 has a variable decreasing power or voltage ramp. The user or the factory may set the rise time var-rt and the fall time var-ft for slope power circuits 214, 216. The user can turn ON/OFF variable light lamp L1 by operating manual switch 220. Coupled to the output of power circuit 212 and particularly the variable power output of function blocks 214, 216, is a level detector 222. Level detector 222 determines when the level on rising power line or output 214 reaches a certain point (predetermined level) and thereby applies a control signal to switch 240 thereby turning ON full power lamp L2. In another instance, level detector 222 determines when the falling power control signal from function block 216 falls below a predetermined threshold and supplies a control signal to switch 240 to turn OFF lamp L2. The user can manually turn ON and OFF the switch 240 by the manual control shown in FIG. 5.

Figure 6:
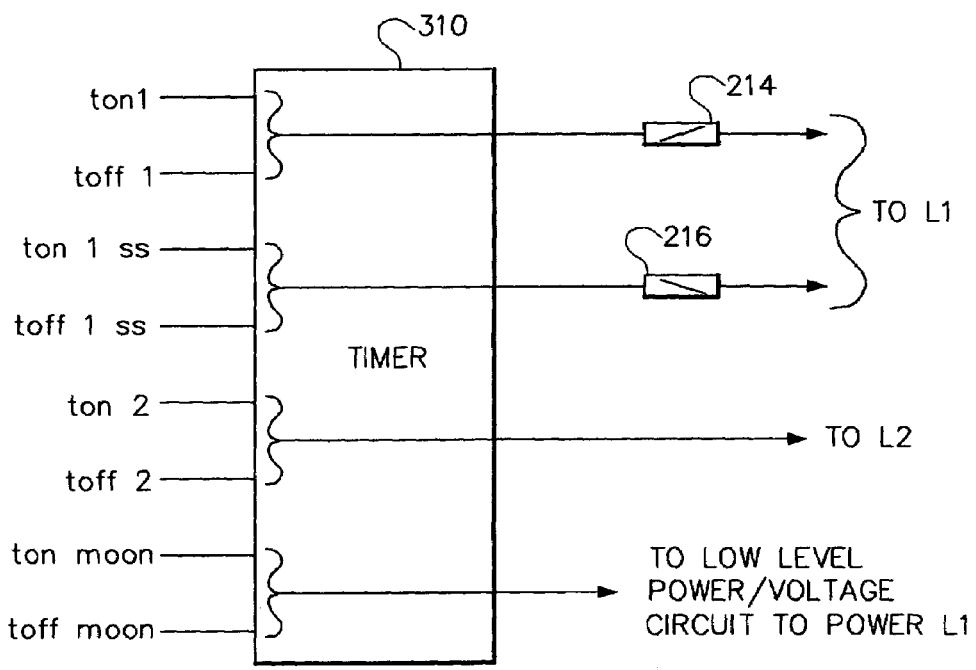
FIG. 6 diagrammatically illustrates a portion of another embodiment of the present invention utilizing a multiple input timer to drive variable lumen output lamp and the quick, full ON lamp.

FIG. 6 shows a multiple input timer which accepts various time ON and time OFF signals which turn ON and OFF lamp L1 (variable light output) or L2 (full ON or full OFF light output) as well as an optional moon light circuit which generally gives a low level power or voltage supply to variable light output lamp L1. Other moon light circuits may be used. Timer 310 accepts time input data or controls from the operator such as time ON 1 and time OFF 1 for the sunrise power circuit 214. Time 310 also accepts t-on-ss and t-off-ss which is the sunset time for sunset power control circuit 216. The output from power circuits 214, 216 are applied to variable light intensity lamp L1. In this embodiment, lamp L1 is turned ON for a short period of time representing the sunrise (t-on1 through t-off1) and then is turned OFF and then is turned back ON during the sunset period (t-on1-ss through t-off-1ss). The full ON lamp L2 is turned on at t-on2 and turned off at t-off2. The following Sequence Table shows control ON-OFF sequences.

Sequence Table ton1; ton2; toff1; ton1ss; toff2; toff1ss; repeat after night cycle period The Table shows that the sunrise circuit goes ON first (T-on1) and then the full ON timer for light L2 is triggered and then the sunrise circuit goes OFF (t-off1). Thereafter, the sunset circuit goes ON for lamp L1 and the full ON light goes OFF and then the sunset circuit times out (t-off1 ss).

The Supplemental Sequence Table set forth below shows that a moon light can be added to the circuit by ton-moon and toff moon. The Supplemental Sequence Table below shows a portion of the sequence which would be supplemental to the Sequence Table set forth above.

Supplemental Sequence Table

... t off2; t onmoon; t off 1ss; t on1; t offmoon

Of course, the timing of the various lamps or light sets L1 and L2 and the slope of the sunrise and sunset circuitry can be modified for optimal performance. Various timers, power circuits and control sensors may be employed.

The claims appended hereto are meant to cover modifications and changes within the scope and spirit of the present invention.

What is claimed is:

1. A light system for an aquarium or a terrarium comprising:
   a first light having a variable light output and subject to a variably increasing or decreasing power control signal, said power control signal increasing or decreasing the light output by said first light;
   a second light having a full ON or a full OFF light output, said second light controlled by an ON-OFF control signal;
   a timer operative to turn ON and OFF said increasing or decreasing power control signal, and said ON-OFF control signal, in a sequential manner.

2. A light system as claimed in claim 1 wherein said first light is a plurality of lights.

3. A light system as claimed in claim 1 wherein said second light is a plurality of lights.

4. A light system as claimed in claim 1 including a control system, operative with said timer, wherein said control system sequences said first and second lights wherein said first light is variably increasing ON, said second light is full ON, said second light full OFF, and said first light variably decreasing.

5. A light system as claimed in claim 4 wherein said control system includes a time OFF and then time ON sub-cycle for said first light intermediate said second light is full ON and said second light full OFF sequence.

6. A light system as claimed in claim 1 wherein said first light is an incandescent lamp.

7. A light system as claimed in claim 1 wherein said second light is a fluorescent lamp.

8. A light system as claimed in claim 1 wherein said first light is an incandescent lamp and said second light is a fluorescent lamp.

9. A light system as claimed in claim 1 including a third lamp timed ON and OFF with a supplemental timer after said second light is subject to said OFF control signal.

10. A light system as claimed in claim 1 wherein one of said variably increasing power control signal and variably decreasing power control signal has a controllably changeable duration.

11. A light system as claimed in claim 2 wherein said second light is a plurality of lights.

12. A light system as claimed in claim 11 including a control system, operative with said timer, wherein said control system sequences said first and second lights wherein said first light is variably increasing ON, said second light is full ON, said second light full OFF, and said first light variably decreasing.

13. A light system as claimed in claim 12 wherein said control system includes a time OFF and then time ON sub-cycle for said first light intermediate said second light is full ON and said second light full OFF sequence.

14. A light system as claimed in claim 13 wherein said first plurality of lights includes an incandescent lamp.

15. A light system as claimed in claim 14 wherein said second plurality of lights includes a fluorescent lamp.

16. A light system as claimed in claim 15 including a third lamp timed ON and OFF with a supplemental timer after said second light is subject to said OFF control signal.

17. A light system as claimed in claim 16 wherein one of said variably increasing power control signal and variably decreasing power control signal has a controllably changeable duration.

18. A method of lighting an aquarium or a terrarium comprising:
variably increasing light output from a first light;
thereafter turning ON a second light;
turning OFF said second light; and then
variably decreasing light output from said first light;
to simulate sunrise and sunset for said aquarium or terrarium.

19. A method of lighting an aquarium or a terrarium as claimed in claim 18 including changing the duration of said variably increasing light output from said first light.

20. A method of lighting an aquarium or a terrarium as claimed in claim 19 including changing the duration of said variably decreasing light output from said first light.

21. A method of lighting an aquarium or a terrarium as claimed in claim 18 including turning OFF both said first and second lights for a predetermined time.

22. A method of lighting an aquarium or a terrarium as claimed in claim 21 wherein said predetermined OFF time is changeable.

23. A method of lighting an aquarium or a terrarium as claimed in claim 21 including turning OFF said first light after said second light is ON and turning ON said first light before variably decreasing light output from said first light.

* * * * *